United States Patent
Sun et al.

(10) Patent No.: US 9,338,544 B2
(45) Date of Patent: May 10, 2016

(54) DETERMINATION, DISPLAY, AND ADJUSTMENT OF BEST SOUND SOURCE PLACEMENT REGION RELATIVE TO MICROPHONE

(71) Applicant: Cisco Technology, Inc., San Jose, CA (US)

(72) Inventors: Haohai Sun, Sandvika (NO); Bjørn Winsvold, Tranby (NO); Per Waagø, Oslo (NO); Amund Holmboe Basmo, Asker (NO); Øystein Bredvei, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 29 days.

(21) Appl. No.: 14/294,667

(22) Filed: Jun. 3, 2014

(65) Prior Publication Data
US 2015/0350769 A1    Dec. 3, 2015

(51) Int. Cl.
| | |
|---|---|
| H04N 7/15 | (2006.01) |
| H04R 1/32 | (2006.01) |
| G06K 9/00 | (2006.01) |
| H04M 3/56 | (2006.01) |
| H04N 5/232 | (2006.01) |
| H04N 5/77 | (2006.01) |
| H04N 7/14 | (2006.01) |
| H04R 3/00 | (2006.01) |

(52) U.S. Cl.
CPC ............ *H04R 1/326* (2013.01); *G06K 9/00221* (2013.01); *H04M 3/56* (2013.01); *H04N 5/23212* (2013.01); *H04N 5/23219* (2013.01); *H04N 5/23222* (2013.01); *H04N 5/23293* (2013.01); *H04N 5/23296* (2013.01); *H04N 5/772* (2013.01); *H04N 7/142* (2013.01); *H04N 7/147* (2013.01); *H04N 7/15* (2013.01); *H04R 3/005* (2013.01)

(58) Field of Classification Search
CPC ........... H04N 7/15; H04N 7/14; H04N 7/141; H04N 7/142; H04R 5/027; H04R 3/005; H04S 7/40
USPC ...................... 348/14.01–14.16; 715/728, 753
See application file for complete search history.

(56) References Cited

U.S. PATENT DOCUMENTS

| | | | |
|---|---|---|---|
| 5,335,011 | A | 8/1994 | Addeo et al. |
| 8,169,463 | B2 | 5/2012 | Enstad et al. |

(Continued)

FOREIGN PATENT DOCUMENTS

| | | |
|---|---|---|
| JP | 2007235969 | 9/2013 |
| WO | 2007123946 A2 | 11/2007 |

(Continued)

OTHER PUBLICATIONS

M. Kuster, "Reliability of estimating the room volume from a single room impulse response," J. Acoust. Soc. Am., vol. 124, No. 2, pp. 982-993, Aug. 2008.

(Continued)

*Primary Examiner* — Melur Ramakrishnaiah
(74) *Attorney, Agent, or Firm* — Edell, Shaprio & Finnan, LLC

(57) ABSTRACT

A video conference endpoint determines a position of a best audio pick-up region for placement of a sound source relative to a microphone having a receive pattern configured to capture sound signals from the best region. The endpoint captures an image of a scene that encompasses the best region and displays the image of the scene. The endpoint generates an image representative of the best region and displays the generated image representative of the best region as an overlay of the scene image.

26 Claims, 11 Drawing Sheets

(56) References Cited

U.S. PATENT DOCUMENTS

| | | | |
|---|---|---|---|
| 2008/0259731 A1* | 10/2008 | Happonen | 367/121 |
| 2012/0013750 A1* | 1/2012 | Heise | 348/207.1 |
| 2012/0124603 A1 | 5/2012 | Amada | |
| 2012/0155703 A1 | 6/2012 | Hernandez-Abrego et al. | |
| 2012/0163610 A1 | 6/2012 | Sakagami | |
| 2013/0210496 A1* | 8/2013 | Zakarias et al. | 455/569.1 |
| 2014/0136981 A1* | 5/2014 | Xiang et al. | 715/728 |
| 2015/0022636 A1* | 1/2015 | Savransky | 348/46 |

FOREIGN PATENT DOCUMENTS

| | | | |
|---|---|---|---|
| WO | 2007123946 A3 | 11/2007 | |
| WO | 2013045533 A1 | 4/2013 | |

OTHER PUBLICATIONS

E. Mabande et al., "Room geometry inference based on spherical microphone array eigenbeam processing," The Journal of the Acoustical Society of America 134, 2773-2789, Aug. 2013.

"The Role of Critical Distance in Overall Microphone Placement", ProSoundWeb, Nov. 2013, http://www.prosoundweb.com/article/critical_distance/.

Gadget Review, "Squarehead's Audioscope Must Be World's Largest Microphone Array", http://www.gadgetreview.com/2010/10/squareheads-audioscope-must-be-worlds-largest-microphone-array.html, Retrieved Jun. 3, 2014, 5 pages.

Extended European Search Report in corresponding European Application No. 15168983.3, dated Oct. 23, 2015, 6 pages.

* cited by examiner

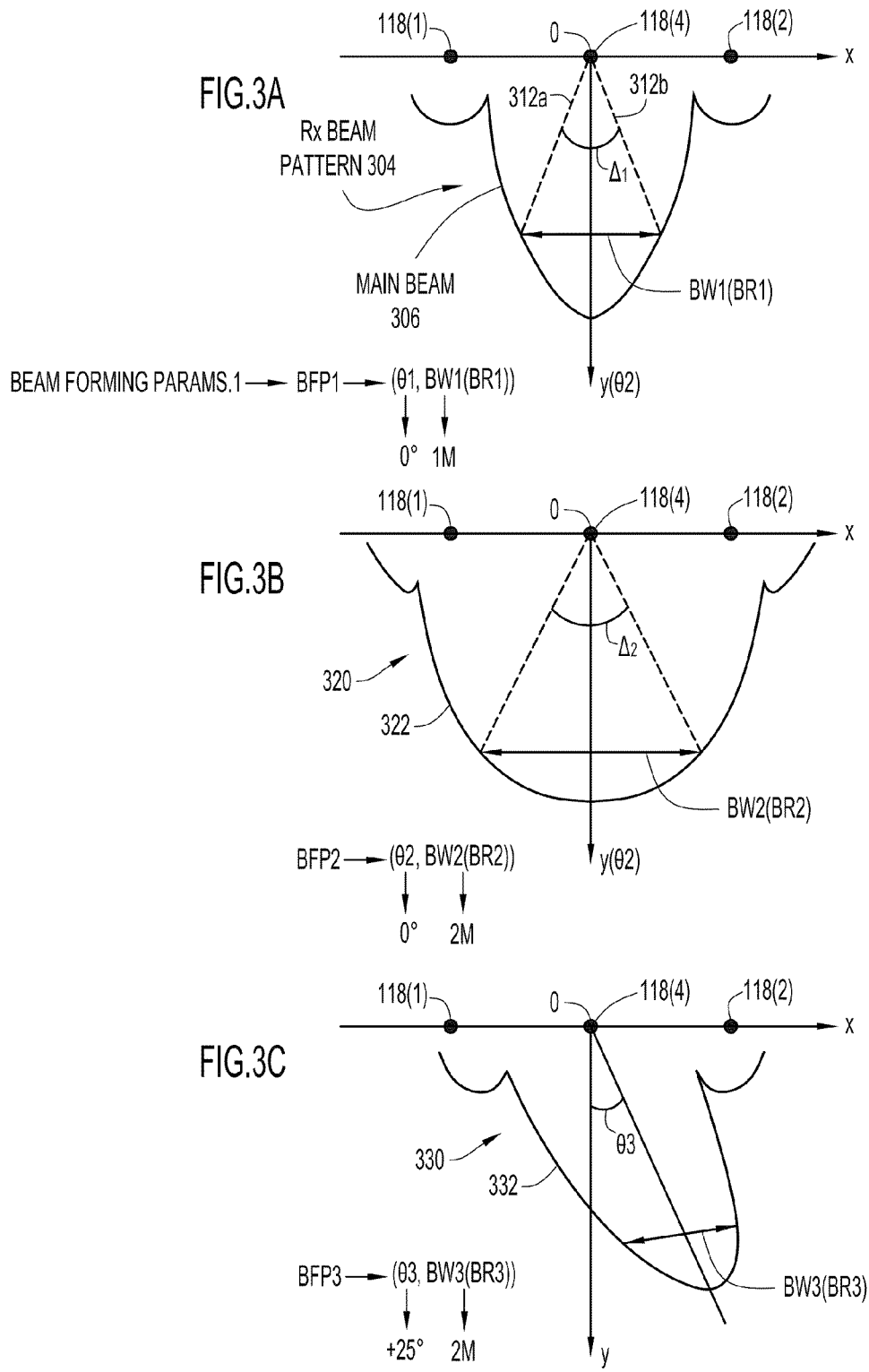

DETERMINATION, DISPLAY, AND ADJUSTMENT OF BEST SOUND SOURCE PLACEMENT REGION RELATIVE TO MICROPHONE

TECHNICAL FIELD

The present disclosure relates to techniques to assist with optimal placement of participants relative to microphones of a video conference endpoint.

BACKGROUND

A video conference endpoint includes a microphone to capture sound from a participant in a room and then the endpoint transmits the captured sound to a conference server or another endpoint. The microphone best captures sound from the participant if the position of the participant (i) falls within a sound pick-up range of the microphone, and (ii) is aligned with a receive beam of the microphone if the microphone is directional. Typically, the participant is not aware of either the pick-up range or the directionality of the microphone array and may, therefore, be positioned sub-optimally with respect to the microphone. Complicating the situation further is the fact that the sound pick-up range for the microphone depends on acoustic characteristics of the room, which are also unknown to the participant.

BRIEF DESCRIPTION OF THE DRAWINGS

FIGS. 3A-3D are illustrations of example audio receive beam patterns formed by microphones of the video conference endpoint responsive to corresponding sets of different beam forming parameters, according to an example embodiment.

DESCRIPTION OF EXAMPLE EMBODIMENTS

Overview

Techniques presented herein determine, display, and adjust an optimal or best sound source placement region, i.e., a "best region," relative to one or more microphones of a video conference endpoint. Sound originating from the best region generally results in a maximum sound response from the associated microphone that captures the sound and a maximum signal-to-noise ratio output from audio processing of the captured sound. In an embodiment, the best region is a region that coincides or is aligned with a positive gain portion of a main beam of a receive pattern of the associated microphone. The video conference endpoint determines a position of the best region relative to a microphone having a receive pattern configured to capture sound signals from the best region. In one embodiment, the endpoint determines the position of the best region based on default beam forming parameters. In another embodiment, the endpoint determines the position (and size) of the best region based on a room Critical Distance Dc. The endpoint may operate in a self-view mode to capture an image of a scene that encompasses the best region and display the image of the scene. The scene typically includes conference participants. The endpoint generates an image representative of the best region and displays the generated image representative of the best region as an overlay of the scene image. Participants thus receive intuitive visual feedback as to where they are positioned in relation to the best region.

Example Embodiments

Figure 1:
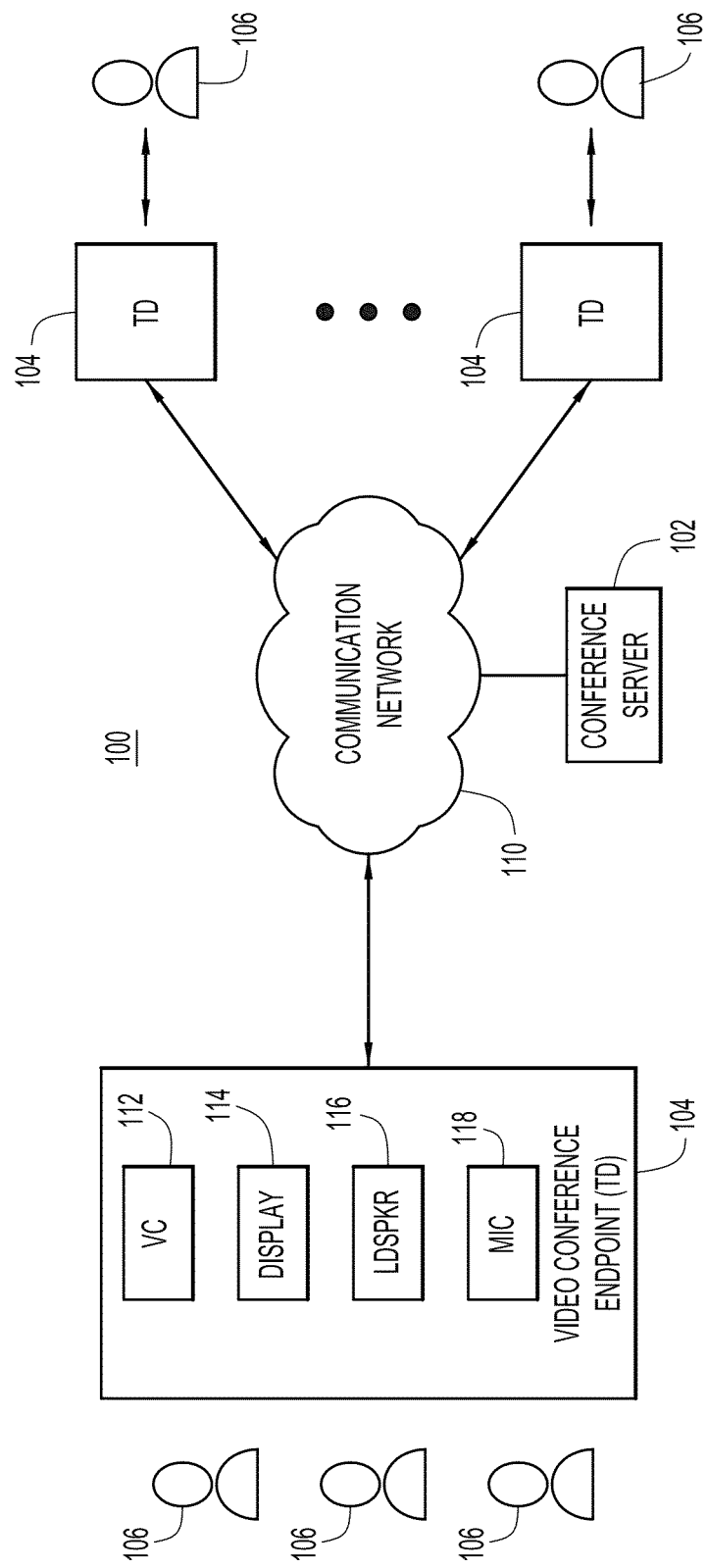
FIG. 1 is a block diagram of an example video conference (e.g., teleconference) environment in which techniques to determine, display, and adjust a best sound source placement region relative to a microphone of a video conference endpoint may be implemented, according to an example embodiment.

With reference to FIG. 1, there is depicted a block diagram of a video conference (e.g., teleconference) environment 100 in which techniques to determine, display, and adjust a best sound source placement region relative to a microphone may be implemented. Video conference environment 100 includes video conference endpoints 104 operated by local users/participants 106 and configured to establish audio-visual teleconference collaboration sessions with each other over a communication network 110. Communication network 110 may include one or more wide area networks (WANs), such as the Internet, and one or more local area networks (LANs). A conference server 102 may also be deployed to coordinate the routing of audio-video streams among the video conference endpoints.

Each video conference endpoint 104 (also referred to as a "teleconference device (TD)" 104) may include a video camera (VC) 112, a video display 114, a loudspeaker (LDSPKR) 116, and one or more microphones (MIC) 118, which may include a combination of one or more microphone arrays and one or more individual microphones. The one or more microphones 118 are referred to herein collectively as microphones 118, and individually as a microphone 118. Endpoints 104 may be wired or wireless communication devices equipped with the aforementioned components, such as, but not limited to laptop and tablet computers, Smartphones, etc. In a transmit direction, endpoints 104 capture audio/video from their local participants 106 with microphones 118/VC 112, encode the captured audio/video into data packets, and transmit the data packets to other endpoints or to the conference server 102. In a receive direction, endpoints 104 decode audio/video from data packets received from the conference server 102 or other endpoints and present the audio/video to their local participants 106 via loudspeaker 116/display 114. As explained hereinafter, techniques are presented herein to be performed by the video conference endpoint 104 to determine, display and adjust a target sound source placement region, relative to one or more microphones 118, so as to best capture audio from one or more conference participants. This target sound source placement region is referred to herein as the "best" region.

Figure 2:
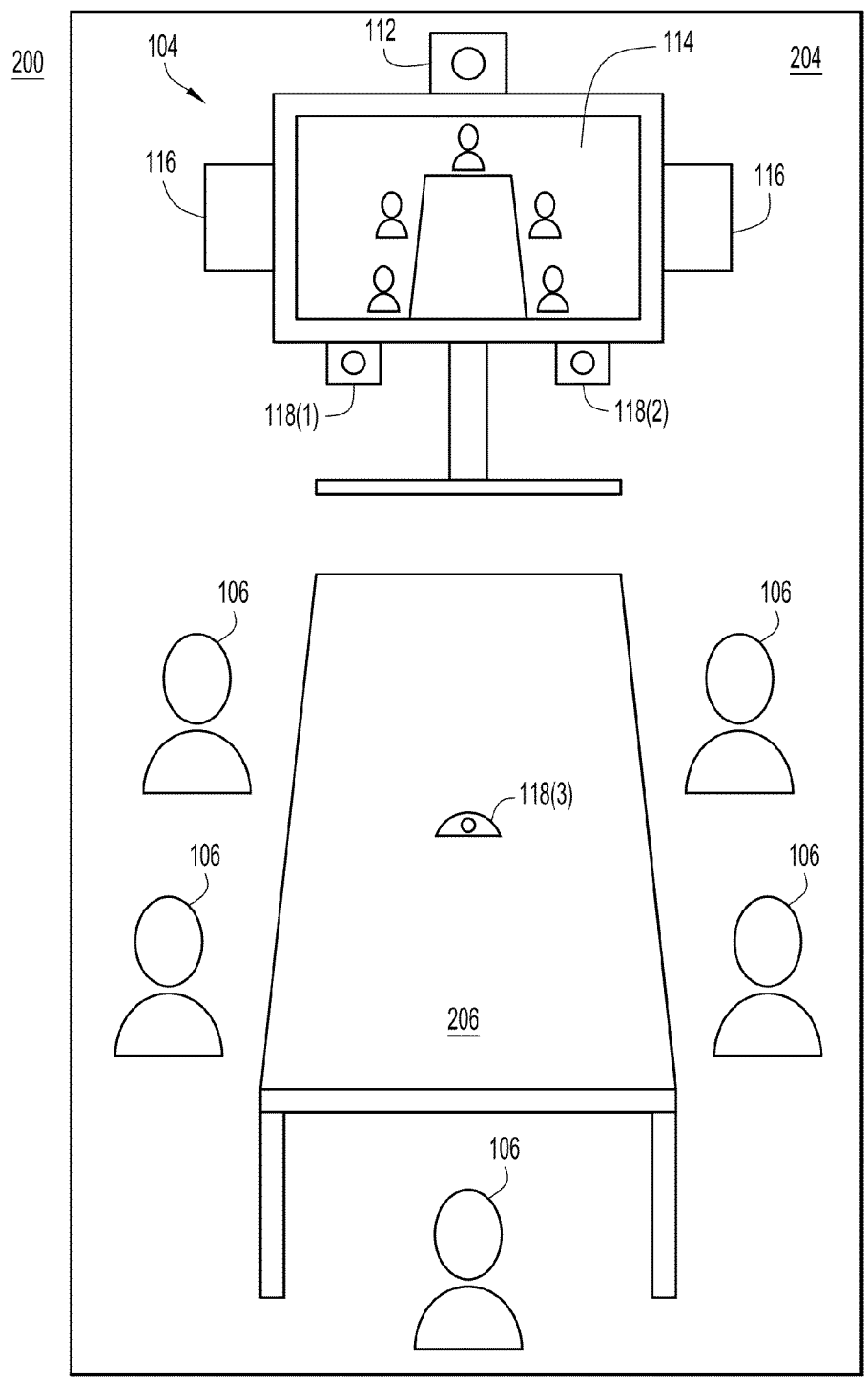
FIG. 2 is an illustration of an example video conference endpoint deployed in a conference room and configured to perform techniques presented herein, according to an example embodiment.

Referring now to FIG. 2, there is depicted an illustration of video conference endpoint 104 deployed in a conference room 204 (depicted simplistically as an outline in FIG. 2). Video camera 112 captures a video of a scene that includes multiple participants 106 facing the camera seated around a table 206 in room 204. As depicted, endpoint 104 operates in a "self-view" mode in which display 114 displays the captured scene so that participants 106 are able to see themselves seated at table 206. Camera 112 typically includes pan, tilt, and zoom (PTZ) features. Video conference endpoint 104 pans, tilts, and zooms video camera 112 as necessary to frame a view of the scene encompassing all of the detected faces. In the example of FIG. 2, endpoint 104 includes spaced-apart microphone arrays 118(1) and 118(2) integrated with display 114 and a remote microphone 118(3) resting on table 206. Microphone 118(3) may be connected wirelessly or through a wired connection with endpoint 104.

Microphones 118 best capture sound from a given one of participants 106 if the position of the participant (i) falls within a best sound pick-up range of the microphone, and (ii) is aligned with a receive beam of the microphone if the microphone is directional, so that the participant (sound source) is aligned with a maximum gain portion (e.g., within a 3, 4, or 5 dB bandwidth portion) of the receive beam. Stated otherwise, microphones 118 best capture sound when the sound originates from a sound source positioned within a "best pick-up region" or "target pick-up region") for placement of the sound source, where the best pick-up region corresponds to the pick-up range of the microphone and/or is directionally aligned with a receive beam of the microphone. Sound originating from the best region generally results in a maximum sound response from the associated microphone that captures the sound and a maximum signal-to-noise ratio output from audio processing of the captured sound. The best pick-up region is also referred to herein simply as the "best region" or "desired region" or "target region."

Techniques described herein automatically determine and then display the best region for microphones 118 in the self-view mode, for example. This gives participants 106 visual feedback as to where they are positioned in relation to the best region; the participants can move to the best region as displayed if they are not already in that region. Techniques described herein also use microphone beam forming to automatically adjust, or enable participants 106 to manually adjust, a position and/or a size of the best region in order to align the best region with the positions of the participants.

Relationships between acoustic beam forming and the best region are now described briefly. A microphone exhibits an audio receive/gain pattern. The best region associated with the microphone depends in part on that receive pattern. Beam forming may be used to control the receive pattern and therefore the best region. The term "beam forming" as used herein is meant generally to also encompass "beam shaping" and "spatial filtering." Beam forming employs beam forming parameters to control beam shapes in the receive pattern, so different beam forming parameters result in different beam shapes. Example beam forming parameters include, but are not limited to, time delays, frequency parameters, signal/amplitude weighting, and signal combining arrangements, depending on the type of beam forming. For completeness, an example beam former and related beam forming technique will be described more fully in connection with FIG. 13; however, it is understood that techniques for beam forming based on beam forming parameters are well known to those of ordinary skill in the relevant arts.

The beam forming parameters determine beam shapes, including (i) a direction/angular offset $\theta$ of a main beam relative to a reference direction, and (ii) a beam width (BW) of the main beam (a positive gain portion of the beam shape), such as a 3-6 dB beam width. Generally, the best region is an area or a volume that coincides or is aligned with the main beam, with certain constraints. The best region is defined by a position and a size thereof. The position may be an approximate center point of the best region that intersects with a direction-line of the main beam (i.e., a main beam axis-line pointing in the direction $\theta$). The size may be a monotonic function of the main beam width BW. In an example, the best region may be a circular/rectangular area centered about the main beam direction-line and having a radius/width based on the beam width BW. Alternatively, the best region may be a spherical/cuboid volume centered about the main beam direction-line and having a radius/(width/height/depth) based on the beam width BW.

Because the beam forming parameters determine the main beam direction $\theta$ and beam width BW, and because the main beam direction and the beam width in turn determine the best region position and size, it follows that the beam forming parameters also determine the best region position and size. Thus, different sets of beam forming parameters may be mapped to different corresponding best regions. Illustrations of example beam patterns formed by microphones responsive to corresponding sets of different beam forming parameters are now described in connection with FIGS. 3A-3D.

With reference to FIG. 3A, there is a cross-sectional view of an example receive (RX) beam pattern 304 (plotted relative to an x-axis and a y-axis) formed by one or more microphones 118 (which may each be microphone arrays) positioned along the x-axis based on a set of beam forming parameters (BFP) BFP1. One or more microphone 118 may include only single microphone 118(4) positioned at an origin O, only two spaced-apart microphones 118(1) and 118(2), or all three of the microphones together. Other microphone configurations are possible. Referring also to FIG. 2, the x-axis in FIG. 3 lies in the plane of display 114, while the y-axis in FIG. 3 points toward table 206.

RX beam pattern 304 has a directional main beam 306 formed responsive to beam forming parameters BFP1. Main beam 306 has a beam direction $\theta 1 = 0°$ measured from the y-axis and a 3 dB beam width BW1. A sound source that coincides positionally with main beam 306 within certain constraints is considered to be in a best region BR1. In an embodiment, best region BR1 has a center position (the best region "position") that coincides with the y-axis and a size that approximates the 3 dB beam width BW1. Other measures of beam width and best region size may be used, such as 4 or 5 dB down-points on the main beam. In the example of FIG. 3A, the 3 dB beam width is approximately 1 meter (m) and the best region size (e.g., area) is correspondingly approximately 1 m$^2$ at a predetermined distance from the x-axis. Best region BR1 may also be represented as an angular distance or spread $\Delta 1$ between lines 312a and 312b that radiate from origin O to respective 3 dB down-points of main beam 306 on opposing side of the y-axis, i.e., the best region is a region that coincides or falls within the angular spread/distance of the main beam that is centered on the main beam direction/axis-line.

With reference to FIG. 3B there is depicted a cross-sectional view of an example RX beam pattern 320 formed based on a set of beam forming parameters BFP2. Beam forming parameters BFP2 result in a main beam 322 having a beam direction $\theta2=0°$ like main beam 306, but a 3 dB bandwidth BW2 that is much wider than that of main beam 306. This establishes a best range BR2 having a position that coincides with that of best range BR1, but a size that is larger than that of best range BR1. Thus, beam forming parameters BFP2 expand the size of the best region relative to beam forming parameters BFP2. In the example of FIG. 3B, the 3 dB beam width is approximately 2 m and the best region size (e.g., area) is correspondingly approximately 4 $m^2$ at the predetermined distance from the x-axis.

With reference to FIG. 3C there is depicted a cross-sectional view of an example RX beam pattern 330 formed based on a set of beam forming parameters BFP3. Beam forming parameters BFP3 result in a main beam 332 having a beam direction $\theta3=+25°$, and a 3 dB bandwidth BW3 that is approximately the same as that of main beam 306. This establishes a best range BR3 having a position shifted to the right relative to that of best range BR1, but a size that approximates that of best range BR1.

Figure 3D:
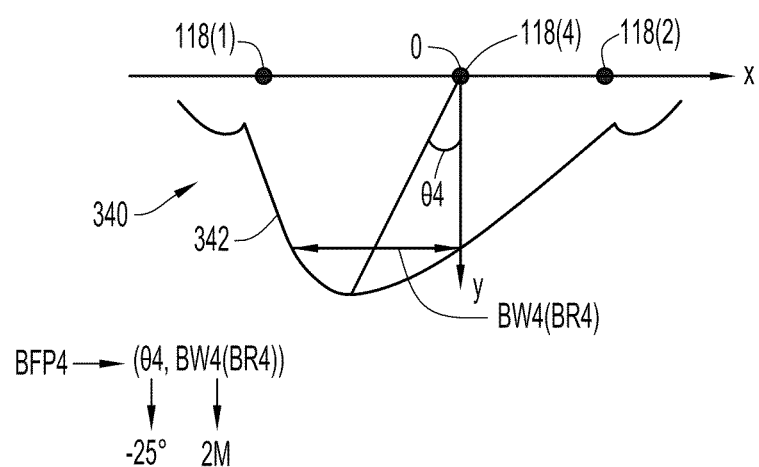

With reference to FIG. 3D there is depicted is a cross-sectional view of an example RX beam pattern 340 formed based on a set of beam forming parameters BFP4. Beam forming parameters BFP4 result in a main beam 342 having a beam direction $\theta1=-25°$, and a 3 dB bandwidth BW4 that is much wider than main beam 306. This establishes a best range BR4 having a position shifted to the left relative to that of best range BR1, and a size that larger than that of best range BR1.

It is understood that mappings between different sets of beam forming parameters BFPx and the corresponding beam shape [$\theta$x, BWx] and thus positions and sizes of best ranges BRx may be determined analytically or empirically over a range of beam directions and beam widths. Moreover, the mappings may be stored for access by a controller, such that given a set of beam forming parameters BFPx, the corresponding best range position and size may be easily determined, and vice versa.

Figure 4:
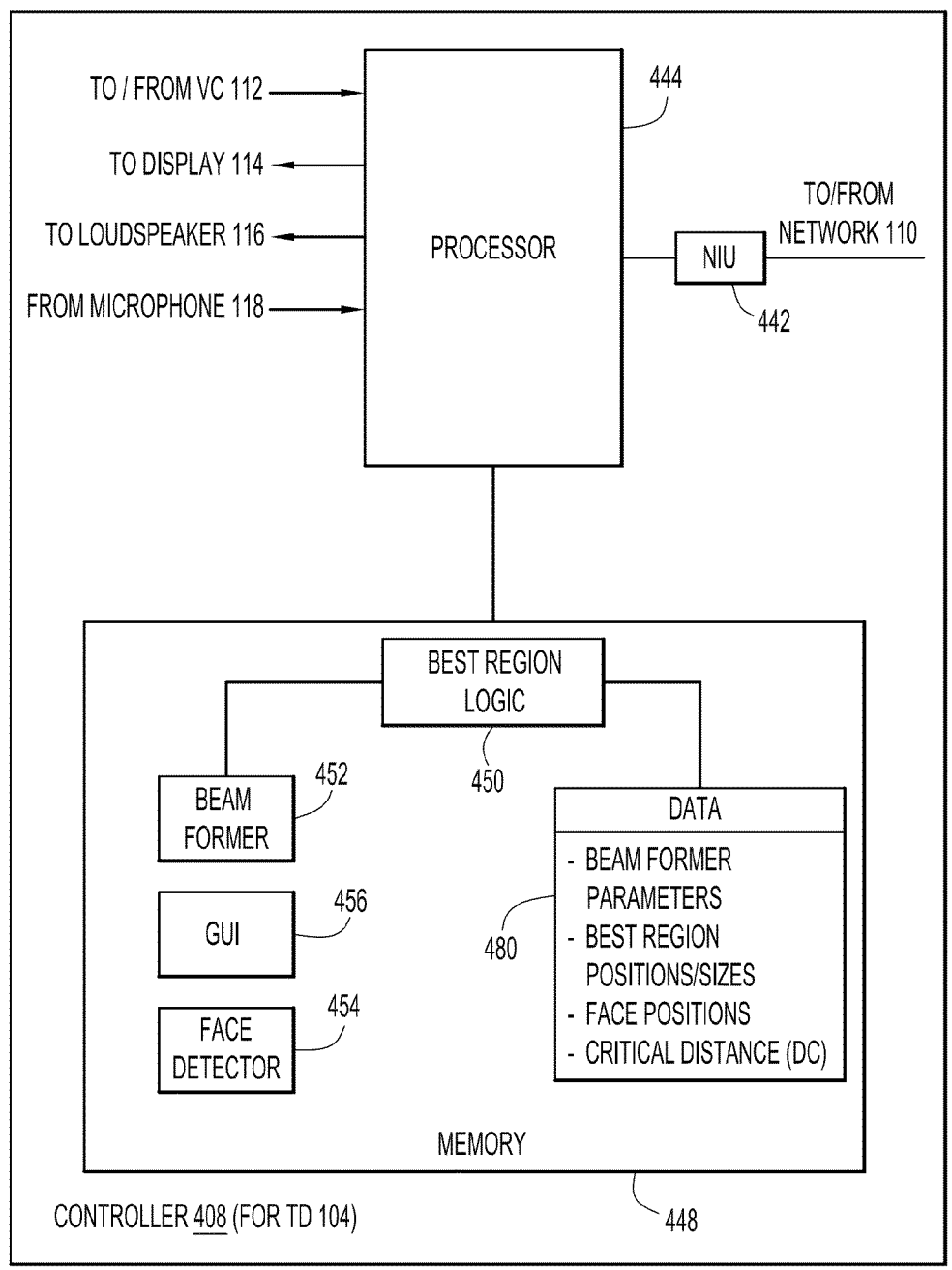
FIG. 4 is a block diagram of an example controller of the video conference endpoint configured to perform the techniques presented herein, according to an example embodiment.

Reference is now made to FIG. 4, which shows an example block diagram of a controller 408 of video conference endpoint 104 configured to perform the techniques presented herein. There are numerous possible configurations for controller 408 and FIG. 4 is meant to be an example. Controller 408 includes a network interface unit 442, a processor 444, and memory 448. The network interface (I/F) unit (NIU) 442 is, for example, an Ethernet card or other interface device that allows the controller 408 to communicate over communication network 110. Network I/F unit 442 may include wired and/or wireless connection capability.

Processor 444 may include a collection of microcontrollers and/or microprocessors, for example, each configured to execute respective software instructions stored in the memory 448. The collection of microcontrollers may include, for example: a video controller to receive, send, and process video signals related to display 112 and video camera 112; an audio processor to receive, send, and process audio signals related to loudspeaker 116 and microphones 118; and a high-level controller to provide overall control. Portions of memory 448 (and the instruction therein) may be integrated with processor 444. As used herein, the terms "audio" and "sound" are synonymous and interchangeably. Processor 444 may send pan, tilt, and zoom commands to video camera 112, which is responsive to the commands as would be appreciated by one of ordinary skill in the relevant arts.

The memory 448 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 448 may comprise one or more computer readable storage media (e.g., a memory device) encoded with software comprising computer executable instructions and when the software is executed (by the processor 444) it is operable to perform the operations described herein. For example, the memory 448 stores or is encoded with instructions for Best Region logic 450 to perform general operations described herein for determining, displaying, and adjusting a best sound source placement region relative to microphones in endpoint 104. Best Region logic 450 uses Beam Forming logic 452 to perform acoustic beam forming based on beam forming parameters, Face Detection logic 454 to perform face detection of participants 106 in captured scenes, and Graphical User Interface (GUI) logic 456 to display information to and accept control input from users.

In addition, memory 448 stores information/data 480 used and generated by logic 450-456, including beam forming parameters, information associated with detected faces (e.g., positions and confidence areas—described below), and best region positions and sizes.

Figure 5:
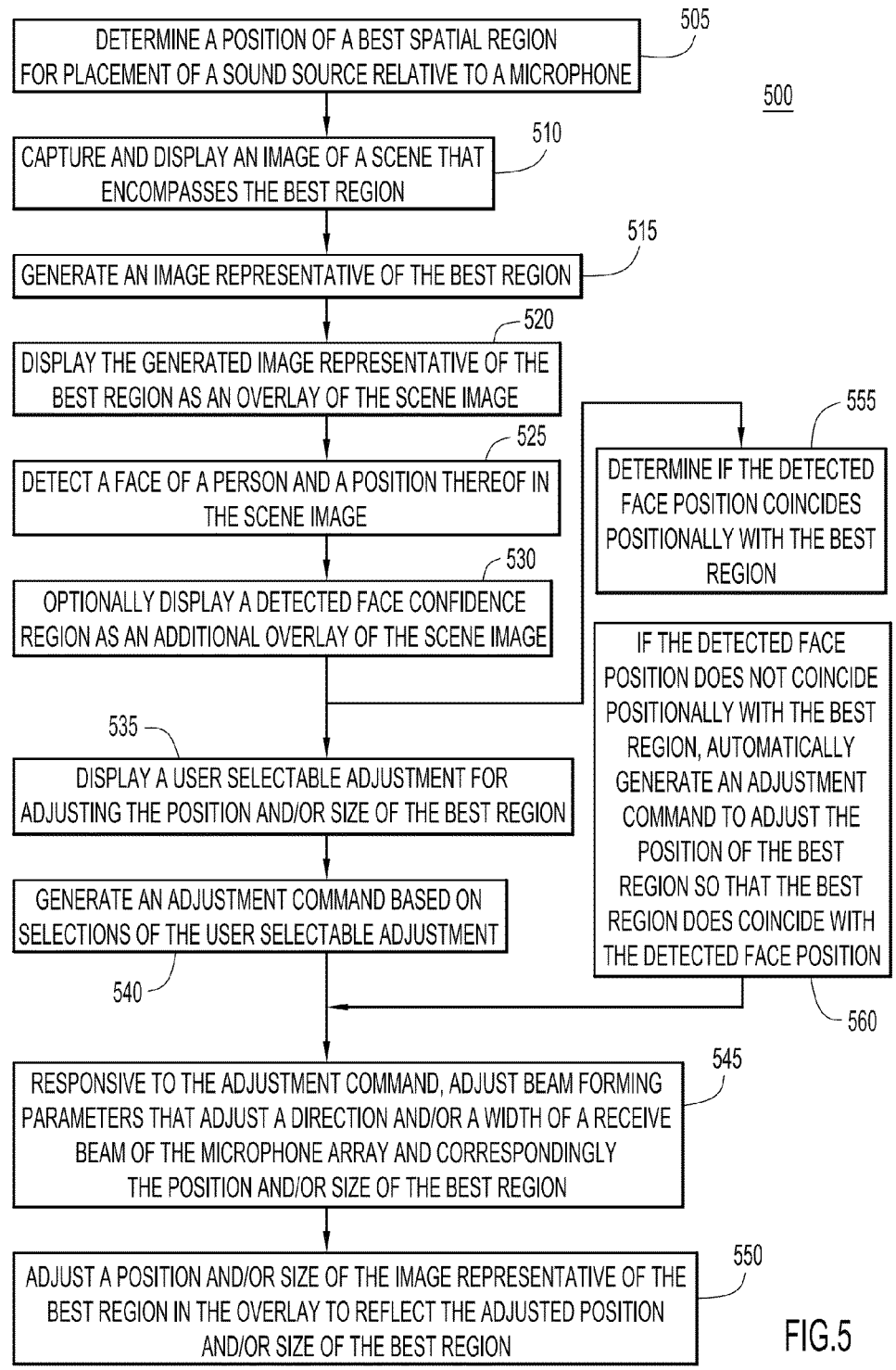
FIG. 5 is a flowchart of an example method of determining, displaying, and adjusting a best sound source placement region relative to a microphone of a video conference endpoint, according to an example embodiment.

With reference to FIG. 5, there is depicted a flowchart of an example method 500 of determining, displaying, and adjusting a best region relative to one or more microphones 118 performed in endpoint 104 as deployed, for example, in room 204.

At 505, controller 408 initially determines a position and a size of a best (spatial) region for placement of a sound source (e.g., participants 106) relative to one or more microphones 118. In a first embodiment, the initially determined best region results from beam forming of transduced sound signals from microphones 118(1) and 118(2) based on initial beam forming parameters. In an example, controller 408 initially determines best region BR1 based on beam forming parameters BFP1. Controller 408 may determine the best region based on additional microphone-related parameters, such as voice tracking parameters and/or spatial filtering parameters. The best region coincides with the main beam of the receive pattern.

In a second embodiment discussed below in connection with FIG. 10, at 505, controller 408 initially determines the position and the size of the best region based on a room critical distance Dc.

At 510, endpoint 104 may operate in the self-view mode. Controller 408 initializes camera 112, i.e., commands the camera to initial pan, tilt, and zoom settings to capture video (i.e., a sequence of image frames) of a scene corresponding to an interior of room 204, including one or more of participants 106 in the room. Display 114 then displays the captured video.

At 515, controller 408 generates an image representative of the best region determined at 505. To do this, controller 408 translates the position and the size of the best region from real-space coordinates to a corresponding image position and a corresponding image size in image-space coordinates using known geometrical translation techniques. The image representative of the best region (also referred to as the "best region image") may be indicated as a translucent shaded best area or by a bolded outline surrounding the best region area, or both, such that the images of the scene (e.g., participants) and the best region are presented/displayed to the viewers. The best region image may be elliptical or rectangular, for example.

At 520, controller 408 displays the generated best region image as an overlay of the scene image displayed at 510 such that both images are readily visible to participants 106. In other words, operation 520 superimposes the best region image over the scene image. The overlay provides visual feedback to participants 106, revealing their positional relationship to the best region. If participants 106 are not positioned in the best region (as indicated on display 114), the participants can move to the best region or, adjust the best region to encompass their positions, as described below.

At 525, controller 408 optionally detects faces and associated face positions of participants 106 in the captured scene based on an analysis of the video frames. Controller 408 may use any now known or hereafter developed technique to detect faces, and may augment face detection with voice detection. Typically, such techniques detect facial features, such as eyes, nose, mouth, hair, etc. As part of known face detection techniques, controller 408 validates each detected face if the face positions thereof detected in successive video frames predominantly fall within a confidence or correlation area associated with that face. In an embodiment, the confidence area may be a rectangular area (i.e., a box).

At 530, controller 408 displays any detected face confidence areas as an additional overlay of the scene image, i.e., the confidence areas are superimposed over the scene image. In an embodiment, controller 408 may also generate and display a preview image of a suggested best region encompassing the detected faces, which is updated as the detected faces move. Controller 408 also generates and displays a user selectable item through which participants may accept or reject the preview image. If the user accepts the preview image, then controller 408 updates At 535, controller 408 generates and displays one or more user selectable adjustments for adjusting the position and/or the size of the best region (as represented as the displayed best region image).

In an embodiment, at 535, controller 408 may also generate and display a preview image of a suggested best region encompassing the detected faces (which may be updated as the detected faces move). In this embodiment, controller 408 also generates and displays a user selectable accept/reject icon through which participants may accept or reject the previewed best region image.

At 540, controller 408 receives user selections of the user selectable adjustments to move and/or resize the best region so that it encompasses, e.g., one or more of participants 106.

In the embodiment that displays the previewed image, controller 408 may receive a selection accepting the previewed image.

At 545, responsive to the adjustment commands (or selection of the previewed image), controller 408 adjusts the beam forming parameters to adjust a direction and/or width of the formed beam to correspondingly adjust the position and/or size of the best region (to reflect the user selections).

At 550, controller 408 adjusts the size and/or position of the best region image in the displayed best region overlay to reflect the adjusted position and/or size of the best region. Participants 106 may command endpoint 104 to route captured sound to loudspeaker 118, so that the participants are able to listen to the captured sound and confirm the quality thereof.

An embodiment that uses face detection may optionally perform operations 555 and 560 for automatic adjustment of the best region based on detected faces, as described below.

At 555, controller 408 determines if one or more of the detected face positions coincide positionally with the best region, e.g., if the best region overlaps with the face confidence areas.

At 560, if one or more of the detected face positions do not coincide positionally with the best region, controller 408 automatically generates an adjustment command to adjust the position and/or size of the best region so that the best region does coincide with the detected face positions. Then flow proceeds to operation 545.

Embodiments other than those described above are possible, including a two mode embodiment used with a personal (small-size) endpoint that employs acoustic beam forming and/or spatial filtering of sound captured by microphone arrays. The two modes include a mode for single-person use and a mode for multiple-person use. For single-person use, beam forming is activated to pick-up sound from a participant directly in front of endpoint 104 (i.e., in front of display 114 and microphone arrays co-located with the display), but not sound from other people in the room in which the endpoint is deployed. For multiple-person use, where a few participants are facing toward endpoint 104, the focused beam forming should be deactivated so that sound is picked-up from all of the participants.

To achieve this goal, controller 408 may count the number of high-quality faces detected in the camera view (captured scene image). If the count indicates there is only one high-quality face detected (i.e., only one face is detected with a high confidence level, or several faces are detected, but one of the faces is detected with (i) a much higher confidence level than the other faces, (ii) a much larger size than the other faces, or (ii) a much shorter distance to camera 112 than the other faces), then beam forming is activated in endpoint 104. On the other hand, if two or more high-quality faces are detected in the camera view (i.e., several detected faces have similar sizes, similar distances to the camera, or similar confidence levels), then microphone beam forming is deactivated. If there are no detected faces, endpoint 104 may either activate or deactivate the beam forming, or mute the microphone completely, dependent on the preference of the participant.

Having described the general method 500 above, example screen shots including self-view scene images and superimposed/overlaid best range images in endpoint 104 are now described in connection with FIG. 6-9.

Figure 6:
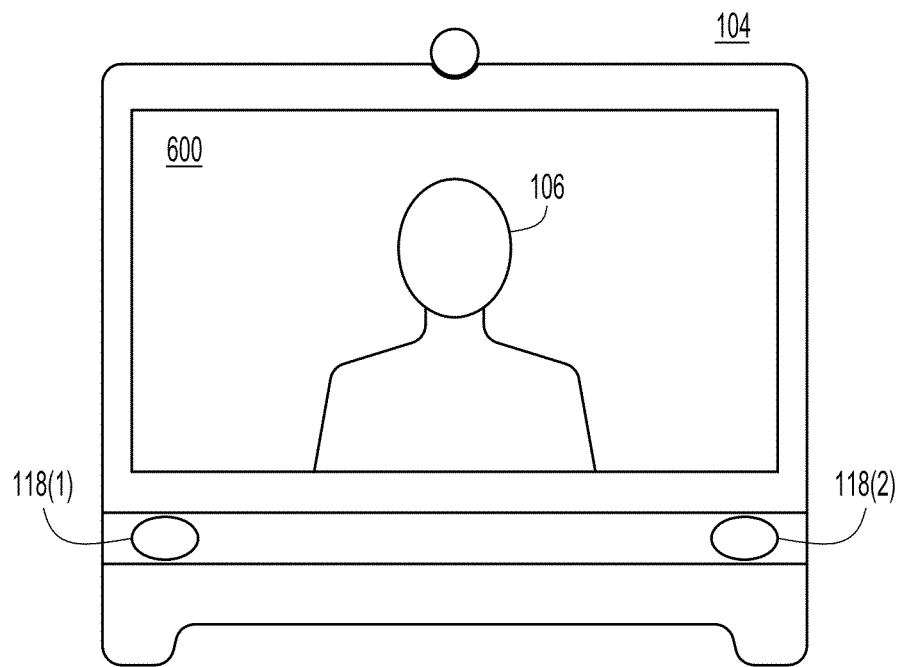
FIGS. 6-9 are example screen shots of self-view scenes and superimposed/overlaid best range images displayed on the video conference endpoint, according to an example embodiment.

With reference to FIG. 6, there is an example self-view screen shot 600 displayed on endpoint 104 after operation 510 of method 500. Screen shot 600 captures a self-view image of participant 106 centered in the scene represented in the screen shot.

Figure 7:
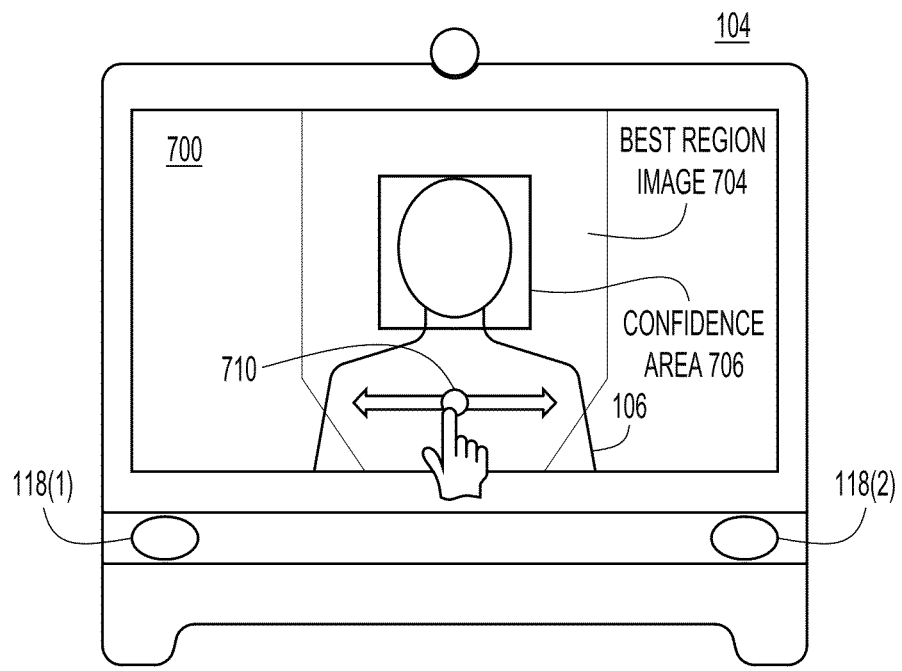

With reference to FIG. 7, there is an example self-view screen shot 700 after operation 535 corresponding to the self-view scene of screen shot 600. Screen shot 700 shows a best region image 704 corresponding to a best region for placement of participant 106 relative to microphones 118(1) and 118(2) that have formed an initial receive beam based on initial beam forming parameters (e.g., beam forming parameters BFP1 that form beam pattern 304 depicted in FIG. 3A). Screen shot 700 also shows a detected face confidence area image 706 for participant 106 superimposed on the original self-view scene (image) captured in screen shot 600. As seen in FIG. 7, the face of participant 106 is centered in best region image 704, indicating that the receive beam from microphones 118(1) and 118(2) is pointed directly at participant 106.

Screen shot 700 also shows a user selectable adjustment bar 710 through which participant 106 may manually adjust a position and/or size of the best region corresponding to best region image 704. For example, in a touch screen embodiment of display 114, participant 106 may touch and swipe bar 710 in a left or a right direction to reposition the best region accordingly, e.g., move the best region to the left or right. Alternatively, right and left keyboard arrow keys or a mouse may be used to select and activate the desired action. Other GUI controls may be used to move and/or resize the best region, such as enabling the participant to drag and drop the best region image to move the best region, or click on the boundary of the best region image and drag the boundary inward and outward to decrease and increase the best region size, similar to an image "zoom" operation.

In the example of FIG. 7, no positional/size adjustment of the best region is necessary because participant 106 is ideally positioned within the best region, as indicated. Should participant activate bar 710 to the left or right, new beam forming parameters will be selected to adjust the corresponding receive beam so as to reflect the left or right selection. In the embodiment in which automated face detection is used in addition to bar 710, positional changes of the detected face of participant 106 may result in beam adjustments similar to those that result if the participant provides adjustment inputs via the bar.

Figure 8:
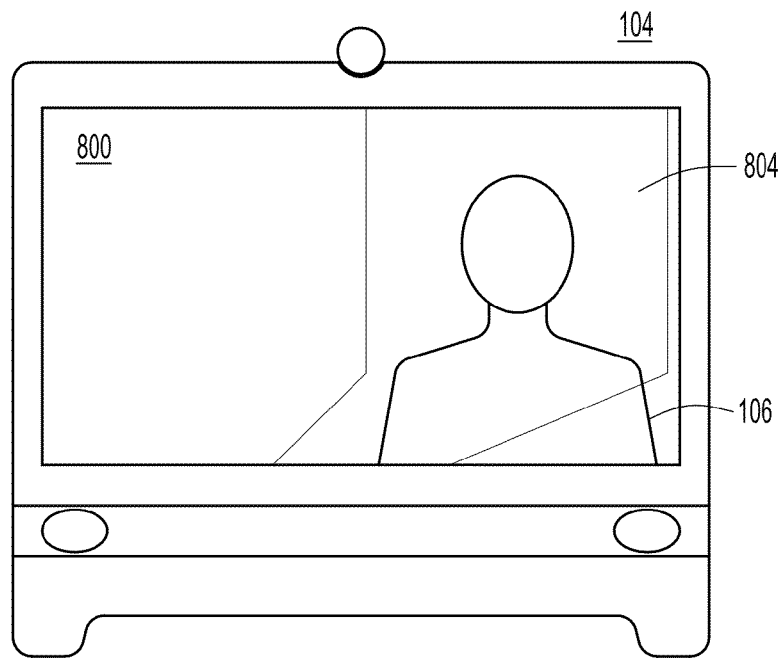

With reference to FIG. 8, there is an example self-view screen shot 800 after participant 106 has moved to the right in the scene. To ensure that participant 106 is still within the best region, the participant has moved the position of the best region from its center position as depicted in FIG. 7 to the right using adjustment bar 710. Accordingly, new best region image 804 coincides with the right-shifted position of participant 106. The shift of the best region to the right in screen shot 800 results from, e.g., new beam forming parameters BFP2 that form beam pattern 332 depicted in FIG. 3C.

Figure 9:
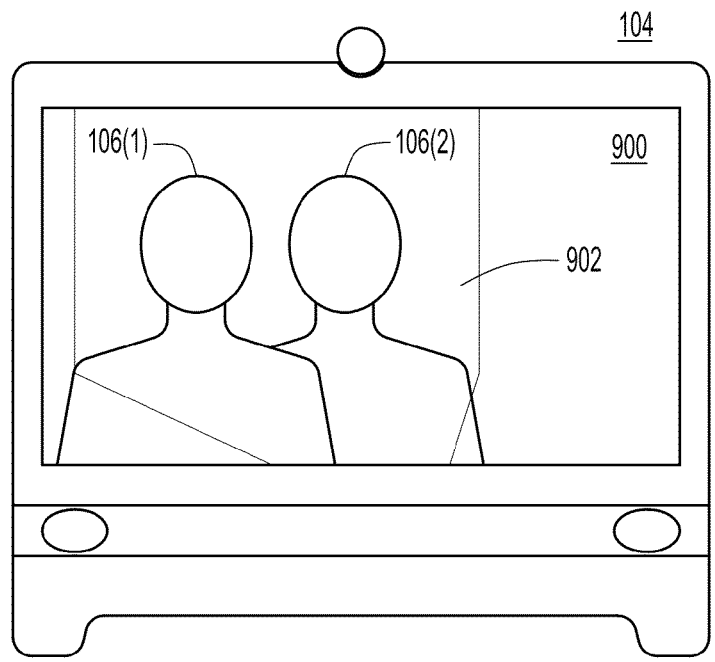

With reference to FIG. 9, there is depicted an example self-view screen shot 900 that captures two participants 106(1) and 106(2) positioned to the left of the scene. In this example, the best region has been increased in size and moved to the left to encompass both of the participants, as indicated by best region image 902. The shift of the best region to the left and expansion of the best region reflected in screen shot 900 result from, e.g., new beam forming parameters BFP4 that form beam pattern 342 depicted in FIG. 3D.

The second embodiment for operation 505 in which the best region is determined based on a room critical distance Dc is now described in connection with FIG. 10.

For any given room, e.g., room 204, there exists a distance at which intensities of direct sound from a talking participant (i.e., the talker or sound source) and reverberant sound are equal. In the field of room acoustics, this distance is defined as the Critical Distance (Dc). If a distance between a microphone and a talker is equal to or greater than the Critical Distance Dc, the captured speech quality will be poor and speech intelligibility will be adversely impacted. While the Critical Distance Dc is well known by audio and acoustic professionals, most conference participants 106 are generally unaware of, or do not understand the significance of, the Critical Distance Dc. Therefore, techniques presented below estimate the Critical Distance Dc for the room in which endpoint 104 is deployed, determine the best range (and thus best region) of a microphone associated with the endpoint based on the determined Critical Distance Dc, and then display the best region, so that the participants receive visible feedback as to whether they are sitting inside the best region. If participants 106 are not inside the best range, they can either change their, or the microphone, positions, or rearrange the room so as to improve room acoustics—because the more acoustically absorbent a room is, the longer the critical distance Dc is, while the more reverberant a room is, the shorter the Critical Distance Dc is.

Figure 10:
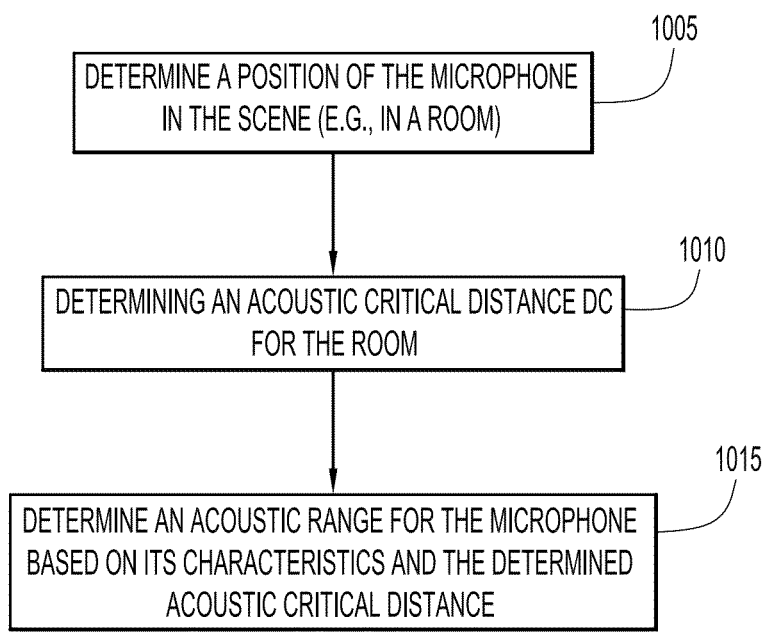
FIG. 10 is a flowchart of an example method of determining a best region based on a room critical distance, according to an example embodiment.

With reference to FIG. 10, there is a flowchart of an example method 1000 of determining the best region based a room Critical Distance Dc. The operations of method 1000 expand on operation 505 described above.

At 1005, controller 408 detects active microphones 118 in room 204 and determines positions of the active microphones. In an example, controller 408 detects microphone 118(3) as active and determines the position of microphone 118(3) resting on top of table 206. Any known or hereafter developed techniques for determining active microphones and determining their positions may be used. Summaries of several techniques are described below.

According to one technique, endpoint 104 plays a test sound signal from loudspeaker 116. When a microphone is active, the associated microphone (receive) channel routed to controller 408 captures the test signal. This may be verified by observing a captured signal level, a signal-to-noise-ratio (SNR), or a cross-correlation between the test signal and the captured signal, for that channel.

According to another technique used in high-end immersive conference systems, for example, where some of microphones 118 are mounted in room 204, the positions of the microphones may already be known and stored in memory 480 a priori. As part of initialization, controller 408 accesses the known positions of microphones 118 that are stored in memory 458.

According to another technique that uses multiple loudspeakers 116 mounted on endpoint 104 at known positions relative to each other, distances from an active microphone to the loudspeakers may be computed using known time-of-arrival (TOA) estimation (i.e., by estimating the time that a test sound signal travels from each loudspeaker to the microphone, and then computing the distances using the formula: Distance=time-of-arrival (TOA)*speed-of-sound). Given the known distance(s) between loudspeakers 116, the position of the active microphones can be obtained using triangulation.

According to another technique, known camera/image based object-detection techniques may employed for active microphone localization. For example, endpoint 104 may detect table microphone 118(3) using object-detection. Object-detection may be combined with other techniques, for example, to verify the active microphone position obtained from triangulation. Combining object detection and triangulation yields more reliable microphone position estimation.

At 1010, controller 408 determines a Critical Distance Dc for room 204. The Critical Distance Dc is dependent on the geometry and absorption of the room in which the sound propagates. Any known technique may be used to determine the critical distance Dc for room 204.

According to one technique, the Critical Distance Dc is determined manually using a sound level meter and a sound source. A relative sound level meter may be implemented in endpoint 104 by combining (i) an omnidirectional microphone (e.g., microphone 118(3)) used as an audio measurement microphone, with (ii) an audio codec included as part of processor 442 to determine sound levels sensed by the microphone. Loudspeaker 116 may be employed as a sound source for the measurements.

According to another technique, the Critical Distance Dc may be determined automatically, which includes operations to: measure impulse responses of room 204 using microphone 118(3) and loudspeaker(s) 116; estimate a reverberation time of the room, RT, using the measured impulse responses; estimate a volume of the room, V, using the measured impulse responses; and then determine the Critical Distance Dc approximately using the known formula: Dc=0.057*sqrt(V/RT). Estimates of the volume V may also be made based on reverberant speech signals, or by scanning room 204 using camera 112 and calculating the volume based on captured images of the scanned room.

At 1015, controller 408 determines an acoustic pick-up range, i.e., best sound pick-up range, for microphones 118 (e.g., for microphone 118(3)) based on known characteristics of the microphones and the determined Critical Distance Dc.

If microphone 118 is omnidirectional, the best range may be calculated as a radius originating at the microphone that defines a volume about the microphone. In this case, the best range may be computed as weight_o*Dc, where weight_o is a weighting factor for an omnidirectional microphone, and can be set as a constant, e.g. 0.3. As a result, the best range may be plotted (and displayed at operation 520) as a circle, a hemisphere, or a sphere. The plotted shape represents the determined best region for the microphone.

If microphone 118 is unidirectional and has a known receive pattern (polar pattern, e.g., cardoid, hypercardoid, or shotgun) and look direction (as is the case for some immersive conference systems having unidirectional microphones mounted in the meeting room), the best range may be computed as weight_u*Dc, where weight_u is the weighting factor for a unidirectional microphone, which is direction/angle dependent, and can be set equal to, e.g. 0.5 for inside-beam directions and 0.1 for outside-beam directions. The best range can be plotted (and displayed at operation 520) in the shape of the microphone receive pattern, in either 2 or 3 dimensions.

Once the best region has been determined, controller 408 generates and displays the best region on display 114 in the self-view mode in operation 520.

Figure 11:
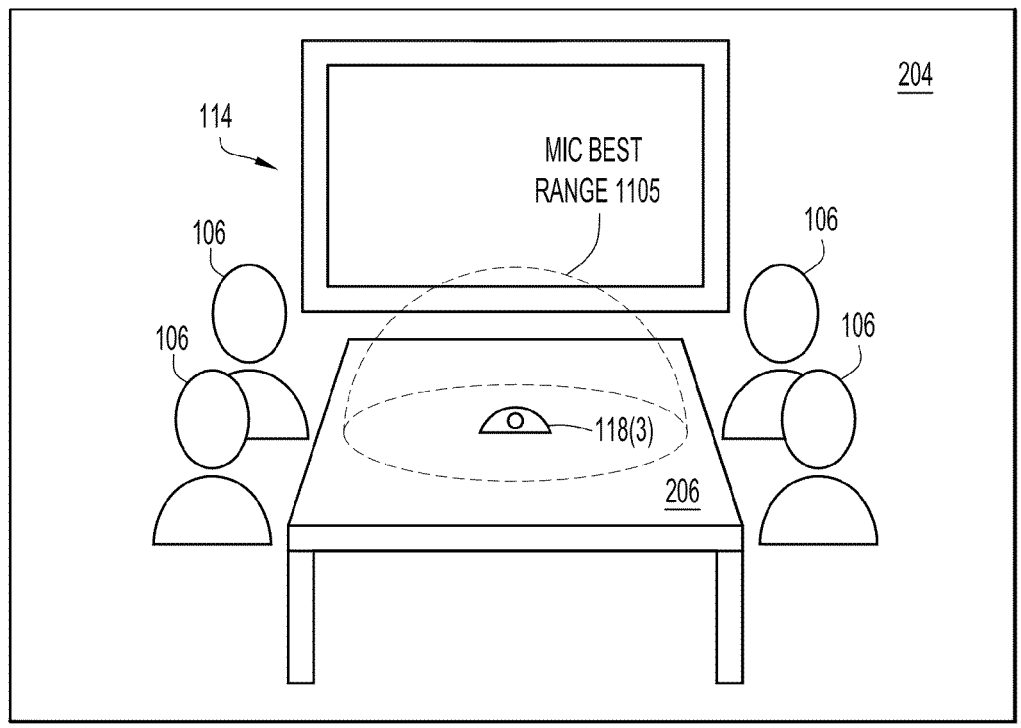
FIG. 11 is an illustration of an example first best region determined for a microphone deployed in a room having a first room critical distance as a result of a first level of reverberation in the room, according to an example embodiment.

With reference to FIG. 11, there is an illustration of an example best region 1105 (corresponding to the best pick-up range) determined for microphone 118(3) in room 204 when the room has a first Critical Distance Dc indicative of a first level of reverberation. Display 114 displays best region 1105 as a hemispherical best region image at operation 525.

Figure 12:
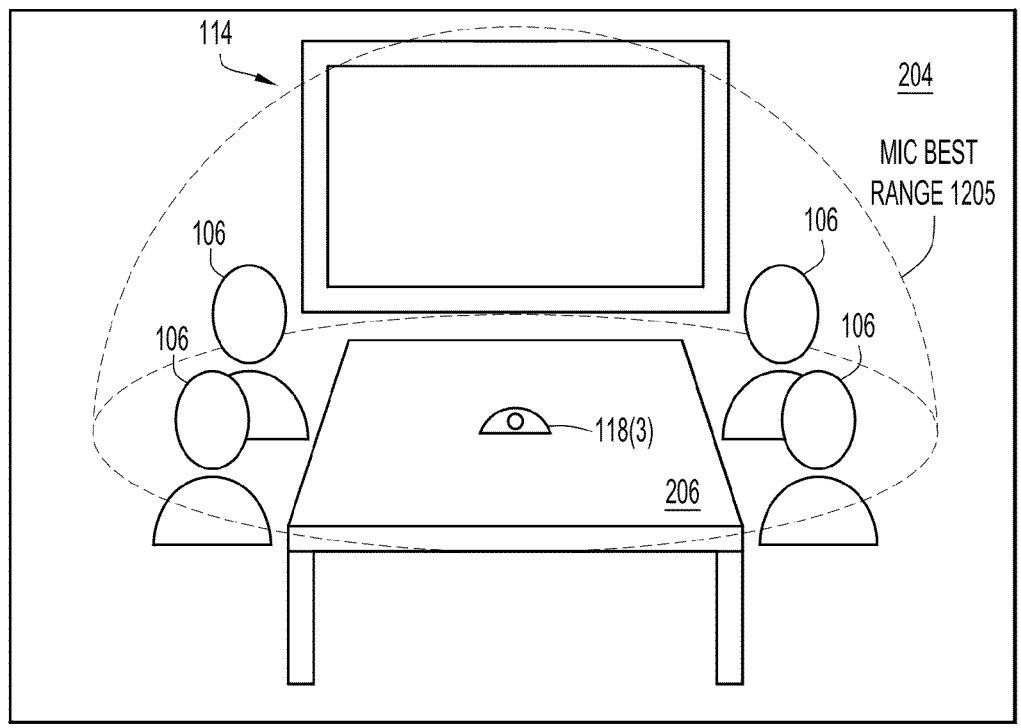
FIG. 12 is an illustration of an example second best region determined for a microphone deployed in a room having a second room critical distance that is greater than the first room critical distance as a result of a second level of reverberation in the room that is less than the first level of reverberation, according to an example embodiment.

With reference to FIG. 12, there is an illustration of an example best range 1205 for microphone 118(3) in room 204 when the room has a second Critical Distance Dc indicative of a second level of reverberation that is less than the first level of reverberation. In other words, room 204 is less reverberant in the example of FIG. 12 than the example of FIG. 11. The second Critical Distance Dc is greater than the first because of the reduced reverberation.

Figure 13:
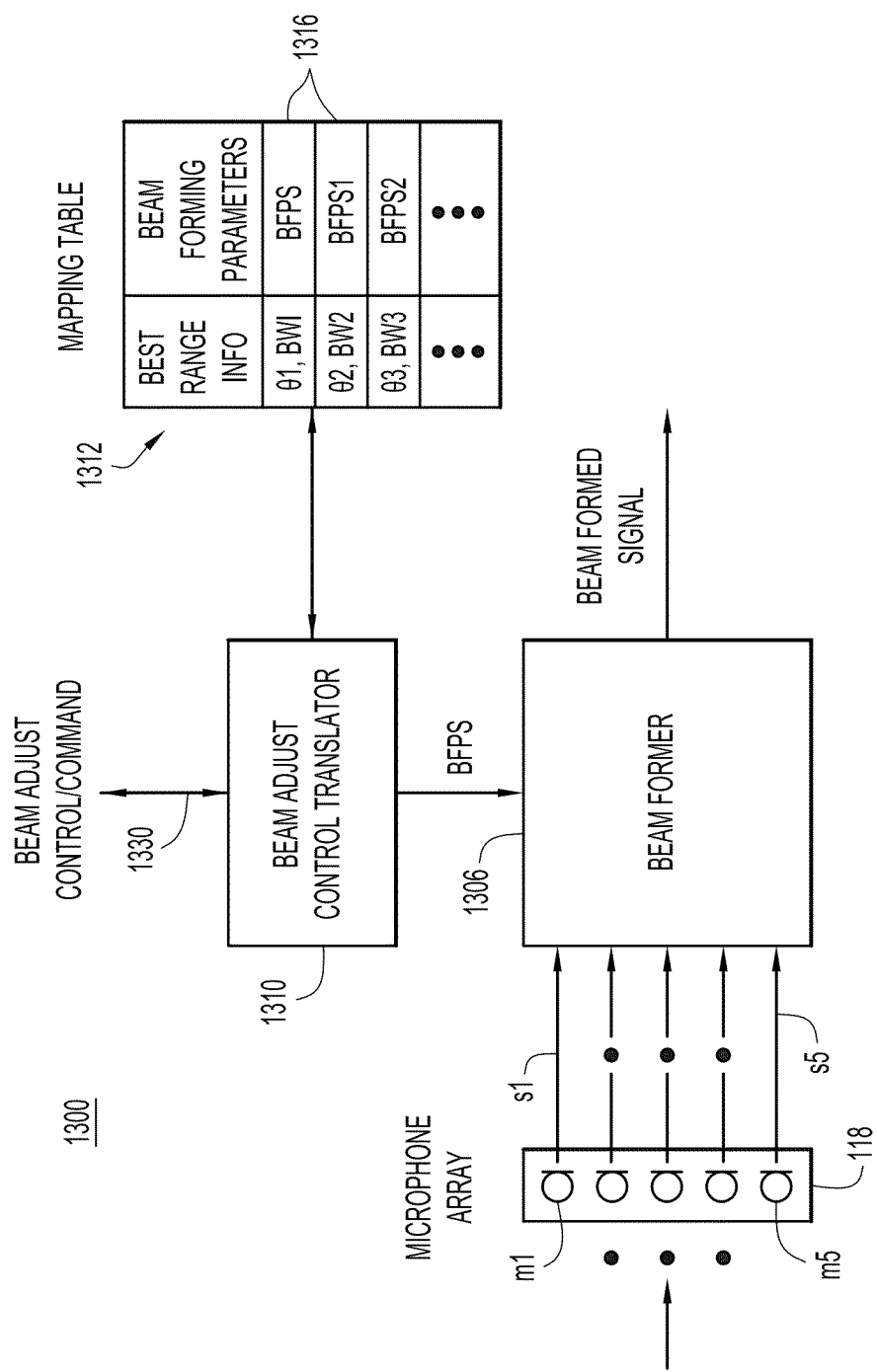
FIG. 13 is a block diagram of an example beam former used in the video conference endpoint, according to an example embodiment.

With reference to FIG. 13, there is depicted a block diagram of an example beam former 1300 used in endpoint 104. Beam former 1300 includes microphone array 118 having multiple microphones m1-m5 each to transduce sound into a respective one of sound signals s1-s5. Typically, sound signals s1-s5 are digitized sound signals. Beam former 1300 also includes a beam former 1306 to process sound signals s1-s5 into a desired receive beam under control of a beam adjust control translator 1310. Beam adjust control translator 1310 has access to predetermined beam forming and best range mapping information stored in a table 1312 in memory 448. Table 1312 stores sets of beam forming parameters for forming corresponding respective receive beams. Table 1312 maps each set of beam forming parameters to (i) a beam direction and beam width, and (ii) definition (position and size) of a corresponding best range from which controller 408 may generate a best range image representative of the best range using standard translation techniques. In an example, table 1312 may store sets of beam forming parameters to form beams having incrementally increasing beam directions over a range +/−90°, and with different beam widths. Beam forming parameters may use an angle to represent a beam direction and an angular distance to define a beam width, e.g., BFP=0 degree beam direction with a 45 degree beam width, or BFP=30 degree beam direction with 60 degree beam width.

Beam former 1306 may be any known or hereafter developed acoustic beam former. Beam former 1306 may be a time-domain beam former that introduces adjustable time delays into sound signals s1-s5, amplitude weights the time-shifted signals, and then combines the weighted, time-shifted signals into one or more composite beam formed signals. In this case, beam forming parameters include the adjustable time delays, amplitude weights (time domain filter coefficients), and combining patterns/paths. Beam former 1306 may be a frequency-domain beam former that deconstructs sound signals s1-s5 in the frequency domain across multiple frequency bands, amplitude weights (frequency domain filter coefficients) for frequency bins in each frequency band, and then combines weighted frequency bins across the different frequency bands into one or more composite beam formed signals. In this case, beam forming parameters include frequency transform parameters (e.g., number of frequency bins per band), amplitude weights, and combining patterns/paths among the frequency bins.

In operation, beam adjust control translator 1310 receives beam adjust commands 1330 from controller 408 to cause beam former 1306 to form/adjust a receive beam. Beam adjust commands 1330 may result from initial power-on routines, operation 540 (user best range adjust), or operation 560 (automated best range adjust) of method 500.

In one example, beam adjust commands 1330 include beam forming parameters necessary to form the desired beam. Beam control translator 1310 looks-up best range information (position, size) corresponding to the received commands 1330 in table 1312 and returns the information to controller 408 so that the controller may generate an updated best range image.

In another example, beam adjust commands 1330 include only a beam direction and a beam width (or a definition of a desired best region). Beam control translator 1310 looks-up corresponding beam forming parameters in table 1312.

Beam adjust control translator 1310 forwards the beam forming parameters to beam former 1306. In response, beam former 1306 forms the desired beam based on the forwarded beam forming parameters.

All of the embodiments described above, whether manual or automatic, may be integrated with different operational modes of the endpoint 104, including the self-view mode, an endpoint/conferencing setup wizard, a diagnostics mode, or a field test/debug mode, and the normal video conference mode (i.e., operation during a video meeting).

Techniques to determine, display, and adjust a best sound source placement region (i.e., best sound pick-up region) relative to a microphone have been presented. The techniques include a self-view mode that enables participants to view and adjust a best pick-up region of microphones in a video conference endpoint. This guarantees that the participants' voices are properly captured by the microphones and clearly heard by others in a video conference. The adjustment can be done either manually or automatically. In one technique, the endpoint estimates a best pickup range/radius of a microphone in a room based on a Critical Distance Dc of the room and automatically displays this range/radius for the microphone in the room, so that conference participants are able to see whether they are sitting inside the best pickup area more intuitively than with conventional approaches. Using this visual feedback, the participants may change talker/microphone positions or, alternatively, improve the room acoustics, or both.

In summary, in one form, a method is provided, comprising: determining a position of a best region for placement of a sound source relative to a microphone having a receive pattern configured to capture sound signals from the best region; capturing an image of a scene that encompasses the best region; displaying the captured image of the scene; generating an image representative of the best region; and displaying the generated image representative of the best region as an overlay of the displayed scene image.

In summary, in another form, an apparatus is provided, comprising: a video camera; a display; a microphone configured to transduce sound received at the microphone; and a processor, coupled to the video camera, the display, and the microphone, and configure to: determine a position of a best region for placement of a sound source relative to the microphone, wherein the microphone is configured to have a receive pattern configured to capture sound signals from the best region; cause the video camera to capture an image of a scene that encompasses the best region; cause the display to display the captured image of the scene; generate an image representative of the best region; and cause the display to display the generated image representative of the best region as an overlay of the displayed scene image.

In summary, in yet another form, a processor readable medium is provided. The processor readable medium stores instructions that, when executed by a processor, cause the processor to: determine a position of a best region for placement of a sound source relative to a microphone having a receive pattern configured to capture sound signals from the best region; cause a video camera to capture an image of a scene that encompasses the best region; cause the display to display the captured image of the scene; generate an image representative of the best region; and cause the display to display the generated image representative of the best region as an overlay of the displayed scene image.

The above description is intended by way of example only. Various modifications and structural changes may be made therein without departing from the scope of the concepts described herein and within the scope and range of equivalents of the claims.

What is claimed is:

1. A method comprising:
   determining a position of a best region for placement of a sound source in an interior of a room that encompasses the best region relative to a microphone having a receive pattern configured to capture sound signals from the best region, the determining including determining a position of the microphone in the interior of the room, and determining an acoustic range for the microphone based at least on characteristics of the microphone;
   capturing an image of a scene of the interior of the room that encompasses the best region;
   displaying the captured image of the scene;
   generating an image representative of the best region; and
   displaying the generated image representative of the best region as an overlay of the displayed scene image, the overlay representing a region coinciding with the determined position and sized according to the determined acoustic range.

2. The method of claim 1, wherein:
   the microphone is configured to form the receive pattern based on beam forming parameters such that the receive pattern includes a directional main beam; and
   the determining includes determining the position of the best region relative to the microphone based on the beam forming parameters, wherein the best region coincides with the main beam.

3. The method of claim 2, further comprising:
   transducing sound received at the microphone into sound signals; and
   performing beam forming on the sound signals based on the beam forming parameters to produce the receive pattern.

4. The method of claim 2, further comprising: receiving a first adjustment command to adjust the position of the best region and, in response:
   adjusting the beam forming parameters so as to adjust a direction of the main beam and correspondingly the position of the best region; and
   adjusting a position of the image representative of the best region in the overlay to reflect the adjusted position.

5. The method of claim 4, further comprising receiving a second adjustment command to adjust a size of the best region and, in response:
   adjusting the beam forming parameters so as to adjust a width of the main beam and correspondingly the size of the best region; and
   adjusting a size of the image representative of the best region in the overlay to reflect the adjusted size.

6. The method of claim 4, further comprising displaying a user selectable adjustment for adjusting the position of the best region, wherein the receiving a first adjustment command includes receiving a selection of the user selectable adjustment for adjusting the position of the best region.

7. The method of claim 4, further comprising:
   detecting a face of a participant and a position thereof in the scene image; and
   automatically generating the first adjusting command to adjust the position of the best region such that the best region coincides with the detected face position if the detected face position does not coincide with the best region.

8. The method of claim 7, further comprising:
   detecting faces of multiple participants; and
   responsive to detecting the multiple faces causing the microphone to form a relatively omni-directional receive pattern.

9. The method of claim 1, further comprising:
   determining an acoustic critical distance of the room; and
   determining the acoustic range based on the determined acoustic critical distance.

10. The method of claim 1, wherein the microphone includes an omnidirectional microphone.

11. The method of claim 1, wherein the microphone is a microphone array having multiple microphones each to transduce sound into a respective sound signal.

12. An apparatus comprising:
   a video camera;
   a display;
   a microphone configured to transduce sound received at the microphone; and
   a processor, coupled to the video camera, the display, and the microphone, and configure to:
      determine a position of a best region for placement of a sound source in an interior of a room that encompasses the best region relative to the microphone, wherein the microphone is configured to have a receive pattern configured to capture sound signals from the best region, wherein the processor is configured to determine by determining a position of the microphone in the interior of the room, and determining an acoustic range for the microphone based at least on characteristics of the microphone;

cause the video camera to capture an image of a scene of the interior of the room that encompasses the best region;

cause the display to display the captured image of the scene;

generate an image representative of the best region; and cause the display to display the generated image representative of the best region as an overlay of the displayed scene image, the overlay representing a region coinciding with the determined position and sized according to the determined acoustic range.

13. The apparatus of claim 12, wherein:
the microphone is configured to form the receive pattern based on beam forming parameters such that the receive pattern includes a directional main beam; and
the processor is configured to determine by determining the position of the best region relative to the microphone based on the beam forming parameters, wherein the best region coincides with the main beam.

14. The apparatus of claim 13, wherein:
the microphone is configured to transduce sound received at the microphone into sound signals; and
the processor is configured to perform beam forming on the sound signals based on the beam forming parameters to produce the receive pattern.

15. The apparatus of claim 13, wherein the processor is further configured to receive a first adjustment command to adjust the position of the best region and, in response:
adjust the beam forming parameters so as to adjust a direction of the main beam and correspondingly the position of the best region; and
adjust a position of the image representative of the best region in the overlay to reflect the adjusted position.

16. The apparatus of claim 15, wherein the processor is further configured to receive a second adjustment command to adjust a size of the best region and, in response:
adjust the beam forming parameters so as to adjust a width of the main beam and correspondingly the size of the best region; and
adjust a size of the image representative of the best region in the overlay to reflect the adjusted size.

17. The apparatus of claim 15, wherein the processor is further configured to cause the display to display a user selectable adjustment for adjusting the position of the best region, wherein the processor is further configured to receive the first adjustment command by receiving a selection of the user selectable adjustment for adjusting the position of the best region.

18. The apparatus of claim 15, wherein the processor is further configured to:
detect a face of a participant and a position thereof in the scene image; and
automatically generate the first adjusting command to adjust the position of the best region such that the best region coincides with the detected face position if the detected face position does not coincide with the best region.

19. The apparatus of claim 12, wherein the processor is further configured to:
determine an acoustic critical distance of the room; and
determine the acoustic range based on the determined acoustic critical distance.

20. A non-transitory processor readable medium storing instructions that, when executed by a processor, cause the processor to:
determine a position of a best region for placement of a sound source in an interior of a room that encompasses the best region relative to a microphone having a receive pattern configured to capture sound signals from the best region, the instructions to cause the processor to determine including instructions to cause the processor to determine a position of the microphone in the interior of the room, and determine an acoustic range for the microphone based at least on characteristics of the microphone;
cause a video camera to capture an image of a scene of the interior of the room that encompasses the best region;
cause the display to display the captured image of the scene;
generate an image representative of the best region; and
cause the display to display the generated image representative of the best region as an overlay of the displayed scene image, the overlay representing a region coinciding with the determined position and sized according to the determined acoustic range.

21. The processor readable medium of claim 20, wherein:
the microphone is configured to form the receive pattern based on beam forming parameters such that the receive pattern includes a directional main beam; and
the instructions include instructions to cause the processor to determine the position of the best region relative to the microphone based on the beam forming parameters, wherein the best region coincides with the main beam.

22. The processor readable medium of claim 21, further comprising instructions to cause the processor to: receive a first adjustment command to adjust the position of the best region and, in response:
adjust the beam forming parameters so as to adjust a direction of the main beam and correspondingly the position of the best region; and
adjust a position of the image representative of the best region in the overlay to reflect the adjusted position.

23. The processor readable medium of claim 22, further comprising instructions to cause the processor to receive a second adjustment command to adjust a size of the best region and, in response:
adjust the beam forming parameters so as to adjust a width of the main beam and correspondingly the size of the best region; and
adjust a size of the image representative of the best region in the overlay to reflect the adjusted size.

24. The processor readable medium of claim 22, further comprising instructions to cause the processor to cause the display to display a user selectable adjustment for adjusting the position of the best region, wherein the instructions include instructions to cause the processor to receive a first adjustment command includes receiving a selection of the user selectable adjustment for adjusting the position of the best region.

25. The processor readable medium of claim 22, further comprising instructions to cause the processor to:
detect a face of a participant and a position thereof in the scene image; and
automatically generate the first adjusting command to adjust the position of the best region such that the best region coincides with the detected face position if the detected face position does not coincide with the best region.

26. The processor readable medium of claim 20, further comprising instructions to cause the processor to:
    determine an acoustic critical distance of the room; and
    determine the acoustic range based on the determined acoustic critical distance.

\* \* \* \* \*